(12) United States Patent
Connery et al.

(10) Patent No.: US 8,201,204 B2
(45) Date of Patent: Jun. 12, 2012

(54) MINIMIZING BLACK VIDEO SEGMENTS DURING AD INSERTION

(75) Inventors: Glenn W. Connery, Petaluma, CA (US); Andrew Palfreyman, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 504 days.

(21) Appl. No.: 12/533,197

(22) Filed: Jul. 31, 2009

(65) Prior Publication Data

US 2011/0030001 A1    Feb. 3, 2011

(51) Int. Cl.
*H04N 7/10* (2006.01)
*H04N 7/025* (2006.01)
*H04N 7/173* (2011.01)

(52) U.S. Cl. .................. 725/87; 725/32; 725/91

(58) Field of Classification Search .............. 725/32, 725/87, 91
See application file for complete search history.

(56) References Cited

OTHER PUBLICATIONS

Ryan Murphy and Brandon Miller; Decomericalizer, Nov. 30, 2007, pp. 1-11.

*Primary Examiner* — Dominic D Saltarelli
(74) *Attorney, Agent, or Firm* — Merchant & Gould (57) ABSTRACT

Black video segments in a video playlist may be minimized. Black detection may be utilized by a network device to identify true starting point and a true ending point of a video asset which includes black video segments in the playlist. Locations associated with the true starting and ending points may be recorded in metadata associated with the video asset. New black video segments may be added at the beginning and at the end of the playlist. Playback of the playlist may then be initiated to play the video asset only between the recorded location associated with the true starting point and the recorded location associated with the true ending point at the network device thereby minimizing the black video segments in the video asset.

20 Claims, 5 Drawing Sheets

MINIMIZING BLACK VIDEO SEGMENTS DURING AD INSERTION

TECHNICAL FIELD

The present disclosure relates generally to the field of networking.

BACKGROUND

Video streams, such as Video On Demand (VOD) assets (programs), may be encoded with black segments to allow time for the content delivery system to lock on to a VOD asset being played and to allow a set top terminal (STT) to tune to the channel that the VOD asset is being target to. The use of black segments without audible audio avoids having the user miss part of the VOD program.

Content providers such as cable multiple system operators (MSOs) and IP television (IPTV) providers may additionally add advertising to VOD assets during playback in a playlist. In these instances, playback of a VOD asset in the playlist is preceded by a "block" of inserted advertisements. Thus, a user, upon viewing a playlist including advertisements, would be presented with a black segment preceding the start of the VOD asset for lock-on/tuning and a black segment prior to the start off "post-roll" advertisements presented after the VOD asset. The black segments before and after the inserted advertisements may cause confusion to a playlist viewer, reduce the effectiveness of the advertisements, and lower the number of viewers who may "play through" the black segments. It is with respect to these considerations and others that the various embodiments of the present invention have been made.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Embodiments are provided for minimizing black video segments in a video playlist. Black detection may be utilized by a network device to identify true starting point and a true ending point of a video asset which includes black video segments in the playlist. Locations associated with the true starting and ending points may be recorded in metadata associated with the video asset. New black video segments may be added at the beginning and at the end of the playlist. Playback of the playlist may then be initiated to play the video asset only between the recorded location associated with the true starting point and the recorded location associated with the true ending point at the network device thereby minimizing the black video segments in the video asset. It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments are provided for minimizing black video segments in a video playlist. Black detection may be utilized by a network device to identify true starting point and a true ending point of a video asset which includes black video segments in the playlist. Locations associated with the true starting and ending points may be recorded in metadata associated with the video asset. New black video segments may be added at the beginning and at the end of the playlist. Playback of the playlist may then be initiated to play the video asset only between the recorded location associated with the true starting point and the recorded location associated with the true ending point at the network device thereby minimizing the black video segments in the video asset.

Figure 1:
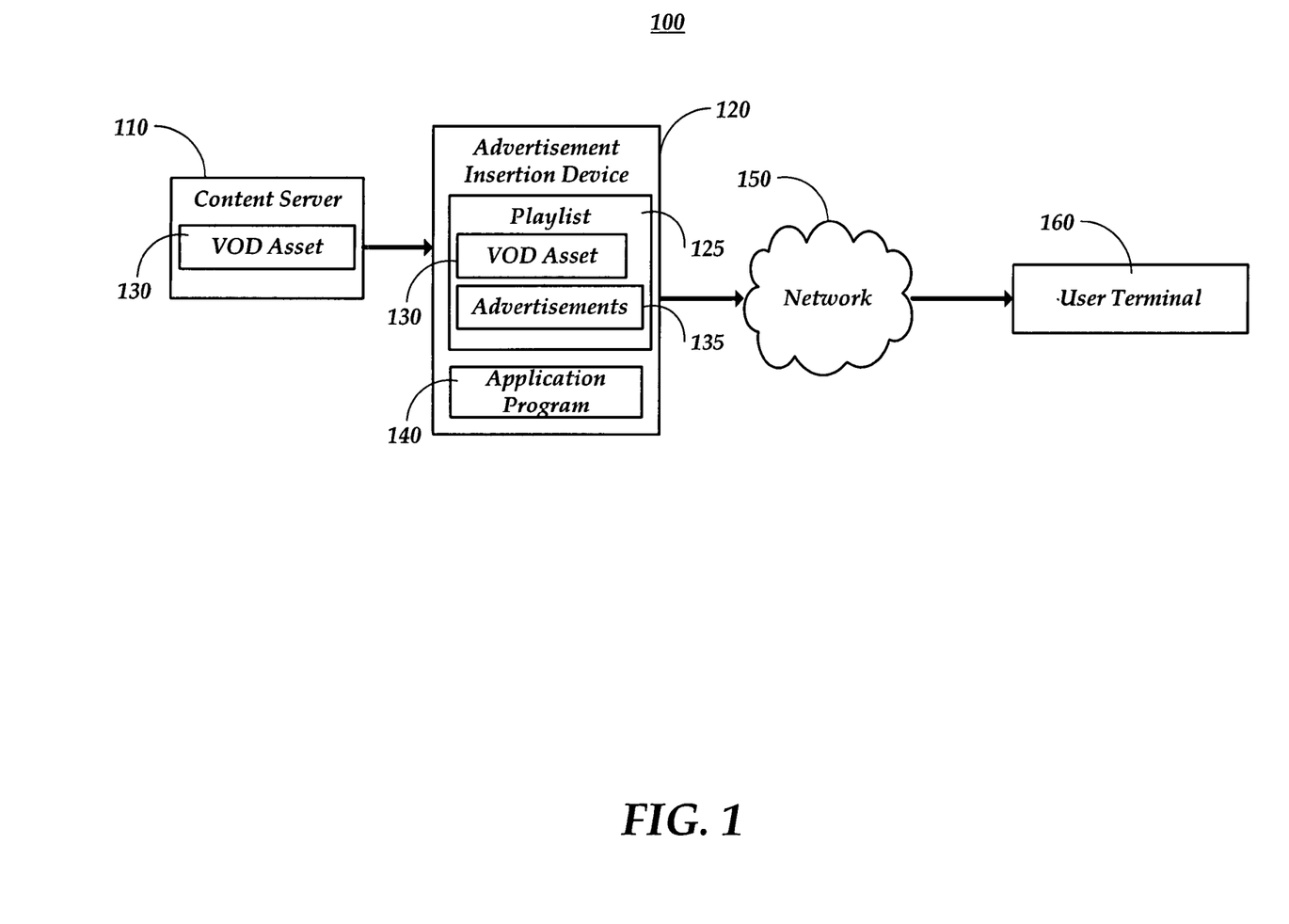
FIG. 1 is a block diagram of a cable television network, in accordance with an embodiment.

FIG. 1 is a block diagram view of a cable television system (CTS) 100 comprising an integrated network system that may feature video, audio, voice and data services to subscribers or STT users. Although FIG. 1 depicts a high level view of the CTS 100, it should be appreciated that a plurality of cable television systems can tie together a plurality of regional networks into an integrated global network so that STT users may receive content or services from anywhere in the world. The CTS 100 may comprise a content server 110, an advertisement insertion device 120, a cable modem termination system (CMTS) (not shown), and a user terminal 160 such as a set-top terminal (STT). Components of the CTS 100 may be connected via a network 150. Any and/or all of the content server 130, the advertisement insertion device 120, and the CMTS may be located in a headend.

The CTS 100 may deliver broadcast video signals as digitally formatted signals in addition to delivering traditional broadcast analog video signals. Furthermore, the CTS 100 may support one-way broadcast services as well as both one-way data services and two-way media and data services. The two-way operation of the network may allow for user interactivity with services, such as Pay-Per-View programming, Near Video-On-Demand (NVOD) programming, Video-on-Demand (VOD) programming, and interactive applications, such as Internet connections and interactive services that render real-time bi-directional communication on a personalized basis such as bi-directional audio-visual communication. The CTS 100 may also provide interfaces, network control, transport control, session control, and servers to access content and services, and distributes content and services to STT users. The CTS 100 may also provide the interfaces, network control, transport control, session control, and servers to establish on-demand session-based bi-directional communication service between a particular remote destination and a STT user for delivering media from the particular remote destination to the STT user and input information from the STT user to the particular remote destination. A remote destination during a session of a bi-directional communication service may comprise a remote personal destination such as a friend or a remote vendor that offers a bi-directional communication service for a purchasable period of time in which a viewer communicates real-time with the vendor on a personal basis. In either case, dedicated resources of the CTS 100 may be allocated to fulfill individualized bi-directional communication over a purchasable period.

As shown in FIG. 1, the CTS 100 may comprise a headend which comprises the content server 110, the advertisement insertion device, and a connection to network 150, such as a hybrid fiber-coax (HFC) network that may connect the headend to user terminal 160 (the terms "user" and "subscriber" may be used interchangeably). In the system headend, an application server and a plurality of other application servers (not shown) may be connected to a digital network control system (DNCS). The application server (not shown) may be responsible for reserving and configuring system resources (e.g. bandwidth) needed to provide bi-directional communication services, for packaging, configuring and making available to the system various software applications and data corresponding to the available bi-directional communication services. The network 150 that may include a plurality of HFC access networks, each of which may serve a local geographical area. An HFC node may be connected to a network interface unit (NIU) of the user terminal 160. The NIU may be located at a user's property and may provide a transparent interface between the HFC node and the users' internal wiring. Coaxial cables may be used to couple nodes and NIUs because the electrical signals can be easily repeated with radio frequency (RF) amplifiers. It should be appreciated that although a single component (e.g., a STT) is illustrated in FIG. 1, the CTS 100 may feature a plurality of any one of the illustrated components or may be configured with alternative embodiments for any one of the individual components or with yet other additional components not enumerated above. The content server 110 may comprise, for example, a Video on Demand (VOD) server for providing a VOD asset 130 for further downstream transmission to subscribers in the network. In accordance with an embodiment, the advertisement insertion device 120 may receive the VOD Asset 130 from the content server 130. The advertisement insertion device 120 may include an application program 140. The application program 140 may be configured to add advertisements 135 to the VOD asset 130 during playback, thereby creating a playlist 125 including the VOD asset 130 and the inserted advertisements 135. In accordance with an embodiment, the application program 140, executing on the advertisement insertion device 120, may utilize black detection on the playlist 125 to minimize black segments appearing before and after the VOD asset 130 prior to playback of the playlist 125 to a user. As should be appreciated by those skilled in the art, various techniques may be utilized to detect black segments (e.g., frames) in video. For example, according to one known technique, algorithms may be implemented to find black frames contained in video by calculating a color histogram in which video frames are converted into grayscale images. The color histogram may be utilized to find occurrences of shades of gray in each image. Then, "near black" pixels may be detected by summing the number of pixels less than a certain threshold of gray. A black frame is detected when the sum of the "near black" pixels is greater than a certain percentage of the total pixels in the image. It should be appreciated that the embodiments discussed herein are not limited to the aforementioned technique and that other techniques for detecting black segments, which are know to those skilled in the art, may also be utilized. It should be appreciated that the advertisement insertion device 120 may comprise a computing device including at least a processor and a memory storage for inserting the advertisements 135, executing the application program 140 and for carrying out various other tasks known to those skilled in the art.

Figure 2:
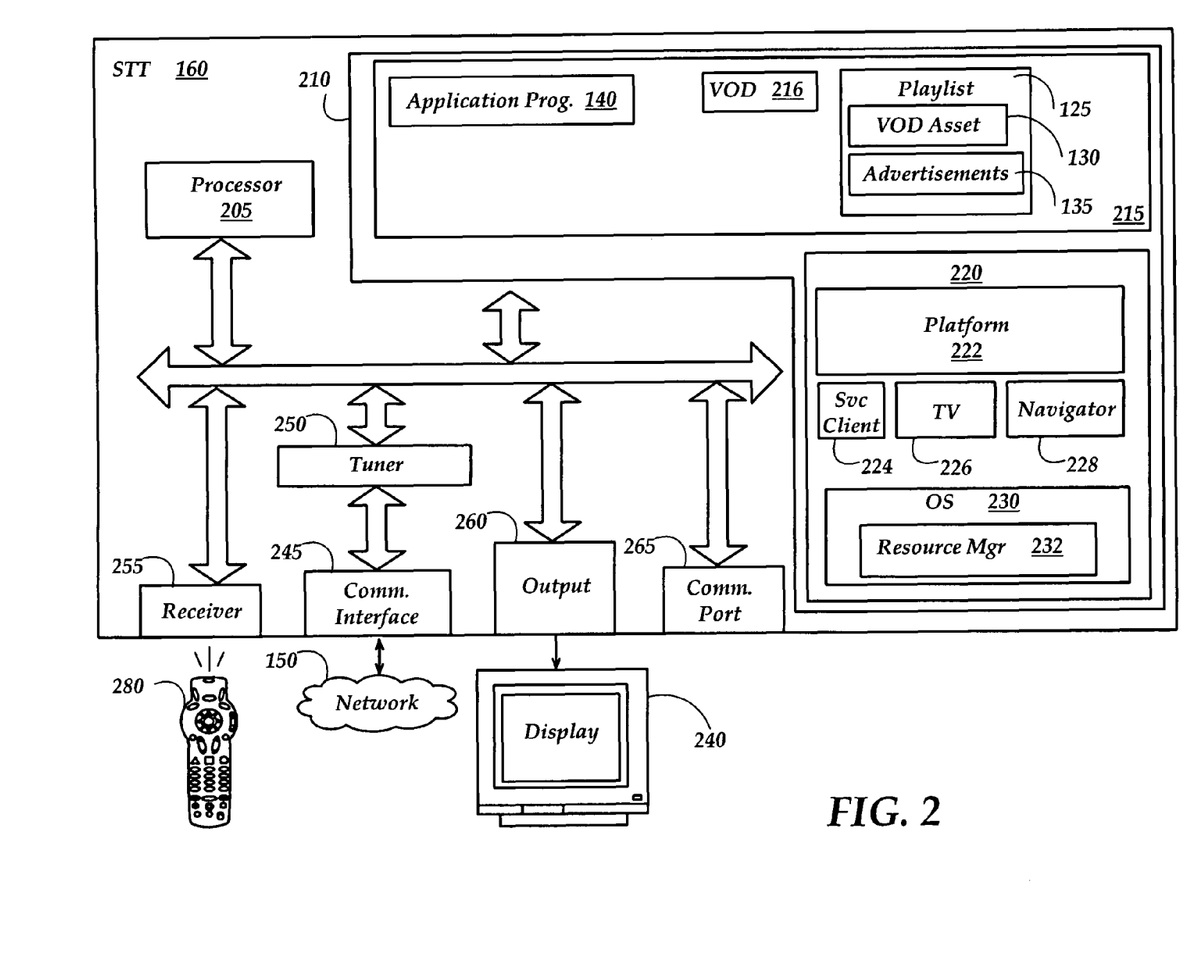
FIG. 2 is a block diagram illustrating a user terminal in the cable television network of FIG. 1, in accordance with an embodiment.

FIG. 2 is a block diagram illustrating components of the user terminal 160. The user terminal 160 may by situated within the residence or business of a subscriber. It may be integrated into a device that has a display, such as a computing device, or it may be a stand-alone unit that couples to an external display, such as a display 240 included with a computer or a television. The user terminal 160 may process media transported in television signals for presentation or playback to a subscriber. The user terminal 160 may comprise a communications interface 245 for receiving the RF signals, which may include media such as video, audio, graphical and data information, and for providing any reverse information (such as admission control data as required by a subscriber that has purchased a bi-directional service) to the headend. The user terminal 160 may further comprise a processor 205 for controlling operations of the user terminal 160, including a video output port such as an RF output system 260 for driving the display 240, a tuner system 250 for tuning into a particular television channel to be displayed and for sending and receiving data corresponding to various types of media from the headend, and for executing application programs such as the application program 140.

The tuner 250 may comprise an out-of-band tuner (OOB) for bi-directional quadrature phase shift keying (QPSK) data communication and a quadrature amplitude modulation (QAM) tuner for receiving television signals. The OOB coupled with an upstream transmitter may enable the user terminal 160 to interface with the network so that the user terminal 160 may provide upstream data to the network, for example via the QPSK or QAM channels. This allows a subscriber to interact with the network. Encryption may be added to the OOB channels to provide privacy.

Additionally, the user terminal 160 may include a receiver 255 for receiving externally generated information, such as user inputs or commands for other devices. The User terminal 160 may also include one or more wireless or wired communication interfaces, such as a communication port 265, for receiving and/or transmitting data to other devices. For instance, the user terminal 160 may feature USB (Universal Serial Bus) (for connection to a USB camera or microphone), Ethernet (for connection to a computer), IEEE-1394 (for connection to media devices in an entertainment center), serial, and/or parallel ports. A computer or transmitter may for example, provide the user inputs with buttons or keys located either on the exterior of the terminal or by a hand-held remote control device 280 or keyboard that includes user-actuated buttons. In the case of bi-directional services, a user input device may include audiovisual information such as a camera, microphone, or videophone. As a non-limiting example, the user terminal 160 may feature USB or IEEE-1394 for connection of an infrared wireless remote control or a wired or wireless keyboard, a camcorder with an integrated microphone or to a video camera and a separate microphone.

The user terminal 160 may simultaneously decompress and reconstruct video, audio, graphics and textual data that may, for example, correspond to a live program service. This may permit the user terminal 160 to store video and audio in memory in real-time, to scale down the spatial resolution of the video pictures, as necessary, and to composite and display a graphical user interface (GUI) presentation of the video with respective graphical and textual data while simultaneously playing the audio that corresponds to the video. The same process applies in reverse and the user terminal 160 can, for example, digitize and compress pictures from a camera for upstream transmission.

A memory 210 of the user terminal 160 may comprise a dynamic random access memory (DRAM) 215 and a flash memory 220 for storing executable programs and related data components of various applications and modules for execution by the user terminal 160. Both the flash memory 220 and the DRAM 215 may be coupled to the processor 205 for storing configuration data and operational parameters, such as commands that are recognized by processor 205.

Basic functionality of the user terminal 160 may be provided by an operating system 230 contained in the flash memory 220. One or more programmed software applications, herein referred to as applications, may be executed by utilizing the computing resources in the user terminal 160. Applications stored in the flash memory 220 or the DRAM 215 may be executed by the processor 205 (e.g., a central processing unit or digital signal processor) under the auspices of an operating system 230. Data required as input by the application program may be stored in the DRAM 215 and read by the processor 205 from the DRAM 215 as needed during the course of application program execution. Input data may be data stored in the DRAM 215 by a secondary application or other source, either internal or external to the user terminal 160, or possibly anticipated by the application and thus created with the application program at the time it was generated as a software application program, in which case it may be stored in the flash memory 220. Data may be received via any of the communication ports of the user terminal 160, from the headend via communication interface 245 (i.e., the QAM or out-of-band tuners) or as user input via receiver 255. A type of input data fulfills and serves the purpose of parameters as described below. Data generated by application program is stored in the DRAM 215 by the processor 205 during the course of application program execution.

The Flash memory 220 may also comprise a platform library 222. The platform library 222 may comprise a collection of functionality useful to applications, such as a timer manager, compression manager (for compressing text, video and/or audio), database manager, string managers, and other utilities (not shown). These utilities may be accessed by applications as necessary so that each application does not have to contain these utilities thus resulting in memory consumption savings and a consistent user interface.

A service client 224 may provide a model in which the user may access services available on the CTS 100. A service may comprise an application to run and a parameter, such as data content, specific to that service. The service client 224 may handle the lifecycle of the applications on the system, including the definition, initiation, activation, suspension and deletion of services they provide and the downloading of the application into the user terminal 160 as necessary. Many services can be defined using the same application component, with different parameters. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID. The service client 224 may also interface with a resource manager 232 to control resources of the user terminal 160.

An application client is the point of an application that executes on the user terminal 160 and provides the application's services to the user typically through a graphical user interface. Also contained in the flash memory 220 is a navigator application 228 that may provide a navigation framework for the user to access services available on the cable system. Examples of the services include, in one implementation, watching television and pay-per-view events, listening to digital music, and an interactive bi-directional service program guide, each of which is controlled through separate applications in the flash memory 220. The navigator 228 may allow users to access various settings of the user terminal 160, including volume, parental control and VCR commands. Moreover, the navigator 228 may provide users with television related menu options that correspond to STT functions such as interactive program guides, channel blocking and/or displaying a content purchase list.

A traditional interactive program guide (IPG), TV 226, and pay-per-view (PPV) are examples of resident applications in the flash memory 220. The IPG displays a program guide to the user and populates the guide with program data for selection. TV 226 may enable a user to simply "watch television" while PPV enables viewing of premium television services. These applications, because they are in the flash memory 220, may always be available to the user and do not need to be downloaded each time the user terminal 160 initializes.

The applications that are stored in the DRAM 215 may be applications that are loaded when the user terminal 160 initializes or are applications that are downloaded to user terminal 160 upon a user-initiated command using an input device such as remote 280. In a non-limiting example, the DRAM 215 may contain the following application clients (hereinafter referred to as "application(s)"): a video-on-demand application (VOD) 216, the application program 140, an e-mail application and a digital music application (not shown). Additionally, the DRAM 215 may comprise a calendar and/or a calculator application (not shown).

The applications discussed above and other applications provided by a cable system operator may comprise top level software entities on the network for providing services to the user. In one implementation, all applications executing on the user terminal 160 may work with the navigator 228 by abiding by several guidelines. For example, an application should first utilize and implement the service client 224 for provisioning, activation, and suspension of services. Second, an application should share STT resources with other applications and abide by the resource management policies of the service client 224, the operating system 230, and the user terminal 160. Third, an application should handle all situations where resources are unavailable without intervention from the navigator 228. Fourth, when an application loses service authorization while providing a service, an application should suspend the service gracefully. The navigator 228 will reactivate an individual service application when it later becomes authorized. Finally, an application should be configured so it does not respond to input commands reserved for the navigator 228. For instance, as a non-limiting example, when user input commands are entered via the remote control device 280 or a keyboard, the application should be configured so it does not have access to certain user input keys that are reserved by the navigator 228 (e.g., power, channel ±, volume ±, etc.). Without limitation to the foregoing, in some circumstances certain applications during the course of program execution may reach a machine-state in which input keys that would ordinarily be reserved may be employed for input by the application but only during that particular machine-state. For example, an application may display a user interface that specifically requests input or selection from the user in which one or more of the reserved keys are used momentarily during that machine-state.

The DRAM 215 may further comprise the application program 140 and the playlist 125 which includes the VOD asset 130 and the advertisements 135. As discussed above with respect to the advertisement insertion device 120 of FIG. 1, the application program 140 in the DRAM 215 may be configured to add the advertisements 135 to the VOD asset 130 during playback, thereby creating the playlist 125 including the VOD asset 130 and the inserted advertisements 135. In accordance with another embodiment, the application program 140, executing on the user terminal 160, may utilize black detection on the playlist 125 to minimize black segments appearing before and after the VOD asset 130 prior to playback of the playlist 125 to a user.

Figure 3:
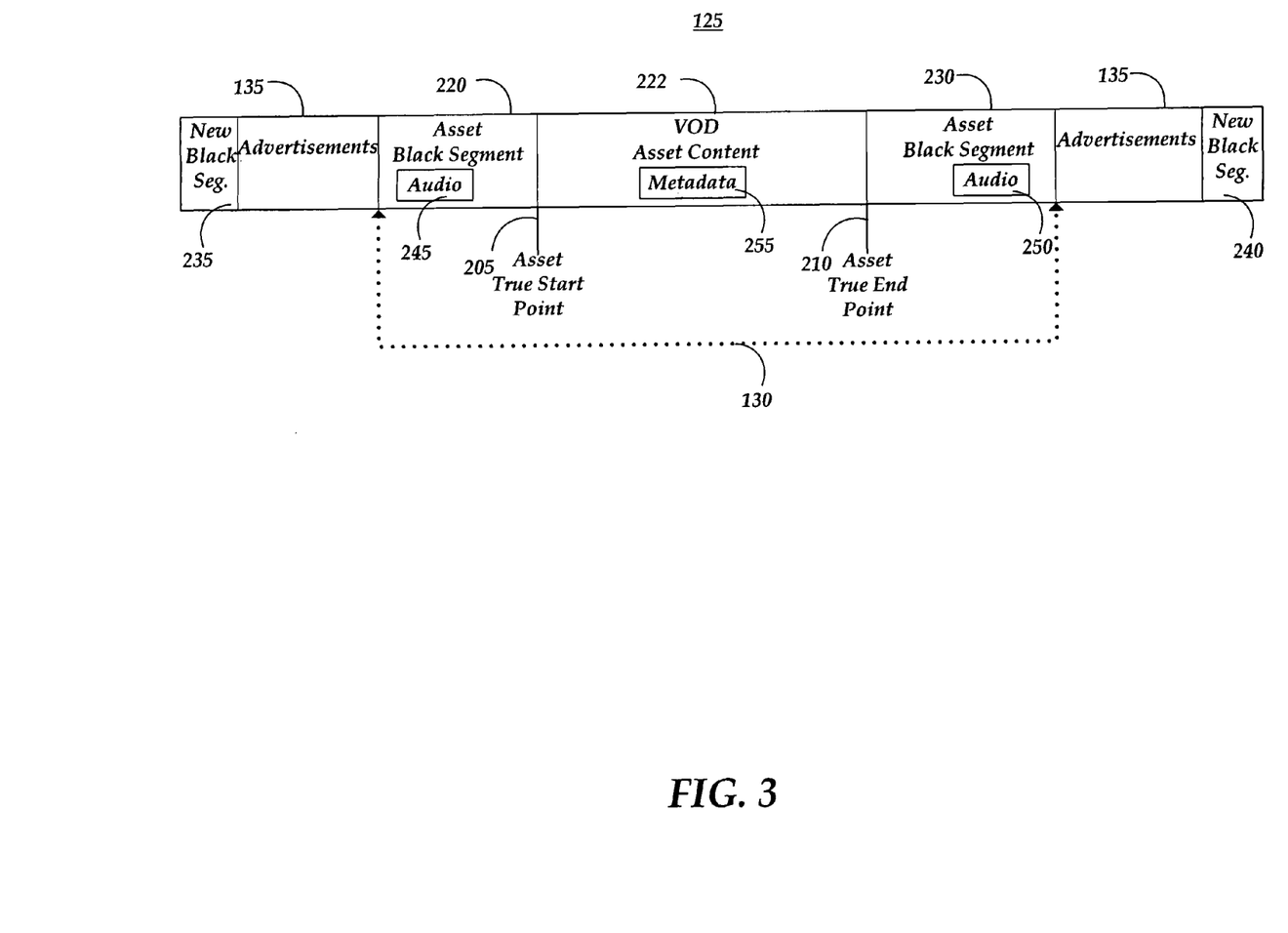
FIG. 3 is a block diagram of a playlist illustrating the recording of locations associated with the starting and ending points of a video asset in metadata and the adding of new black video segments at the beginning and end of the playlist, in accordance with various embodiments.

FIG. 3 is a block diagram of the playlist 125 illustrating the recording of locations associated with the starting and ending points of a video asset in metadata and the adding of new black video segments at the beginning and end of the playlist 125. In accordance with various embodiments, the representation of the playlist 125 shown in FIG. 3 may be generated by the application program 140 executing either on the advertisement insertion device 120, the user terminal 160, or some other network device in the headend of the CTS 100 such as a router (not shown). The playlist 125 includes new black segments 235 and 240, the advertisements 135 (which precede and follow the VOD asset 130), and the VOD asset 130.

The VOD asset 130 may comprise a leader asset black segment 220, VOD asset content 222, and a trailer asset black segment 230. The asset black segments 220 and 230 may be short black video segments, between three and six seconds in length, which are encoded into the VOD asset 130 to allow time for the CTS 100 to lock on to the VOD asset 130 during playback and to allow the user terminal 160 to tune to the channel that the VOD asset 130 is being targeted to. The asset black segments 220 and 230 may optionally comprise audio streams 245 and 250 (such as voice-overs). The VOD asset content 222 may be associated with metadata 255. As will be described in greater detail herein, the metadata 255 may be used to record the locations or lengths of the asset black segments 220 and 230 in the VOD asset 130.

In accordance with an embodiment, the application program 140 may be configured to utilize black detection to identify an asset true start point 205 and an asset true end point 210 associated with the VOD asset 130. In particular, black detection algorithms may be utilized to identify the portion of the VOD asset 130 (i.e., the VOD asset content 222) which does not include the leader and trailer asset black segments 220 and 230. Once identified, the locations or lengths of the asset black segments 220 and 230 may be recorded in the metadata 255 by the application program 140 so that the asset black segments 220 and 230 may be skipped when the VOD asset 130 is played (e.g., on the user terminal 160). The application program 140 may also be configured to add the new black segments 235 and 240 to the playlist 125 in order to maintain any black segments necessary for locking on and tuning to the playlist 125.

Figure 4:
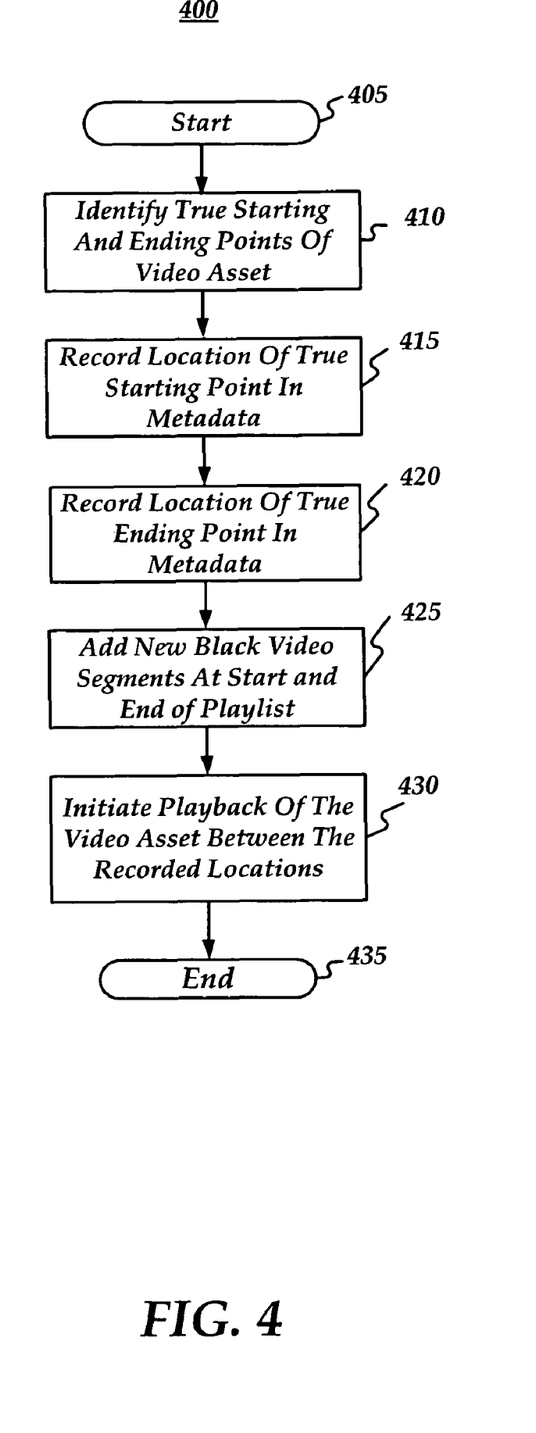
FIG. 4 is a flow chart illustrating a method for minimizing black video segments, in accordance with an embodiment.

FIG. 4 is a flow chart setting forth the general stages involved in a method 400 consistent with an embodiment for method for minimizing black video segments. Method 400 may be implemented using the components of CTS 100 as described above. Ways to implement the stages of method 400 will be described in greater detail below. Method 400 may begin at starting block 405 and proceed to stage 410 where the application program 140, executing on either the advertisement insertion device 120 or the user terminal 160, may identify the true starting and ending points of the VOD asset 130 in the playlist 125. In particular, the application 140 may utilize a black segment detection algorithm to identify the end of the leader asset black segment 220 (following one or more of the advertisements 135) as the asset true start point 205 and to identify the beginning of the trailer asset black segment 230 (preceding one or more of the advertisements 132) as the asset true end point 210.

From stage 410, method 400 may advance to stage 415 where the application program 140 may record the location of the asset true start point 205 in the metadata 255 associated with the VOD asset 130. For example, the application program 140 may record a normal play time of the start of the VOD asset content 222 (i.e., the true start of the asset without the black segments) in the metadata 255.

From stage 415, method 400 may advance to stage 420 where the application program 140 may record the location of the asset true end point 210 in the metadata 255 associated with the VOD asset 130. For example, the application program 140 may record a normal play time of the end of the VOD asset content 222 (i.e., the true end of the asset without the black segments) in the metadata 255.

From stage 420, method 400 may advance to stage 425 where the application program 140 may add the new black segments 235 and 240 to the beginning and end of the playlist 125. In particular, the new black segments 235 and 240 may be utilized during the playback of the playlist 125 to provide black segments which may necessary for the CTS 100 and/or the user terminal 160 to lock on to the playlist 125 during playback and to tune to the channel that the playlist 125 is being targeted to.

From stage 425, method 400 may advance to stage 430 where the application program 140 initiate playback of the video asset between the recorded locations in the metadata 255. In particular, during playback of the playlist 125, the asset black segments 220 and 230 preceding and following the advertisements 135 may be skipped, thus effectively removing them from the VOD asset 130. From stage 430, method 400 may then end at stage 435. It should be understood by those skilled in the art that method 400 may be performed by a number of network devices in the CTS 100 which may include the advertisement insertion device 120 and the user terminal 160 (as discussed above) but which may also include other network devices such as routers.

Figure 5:
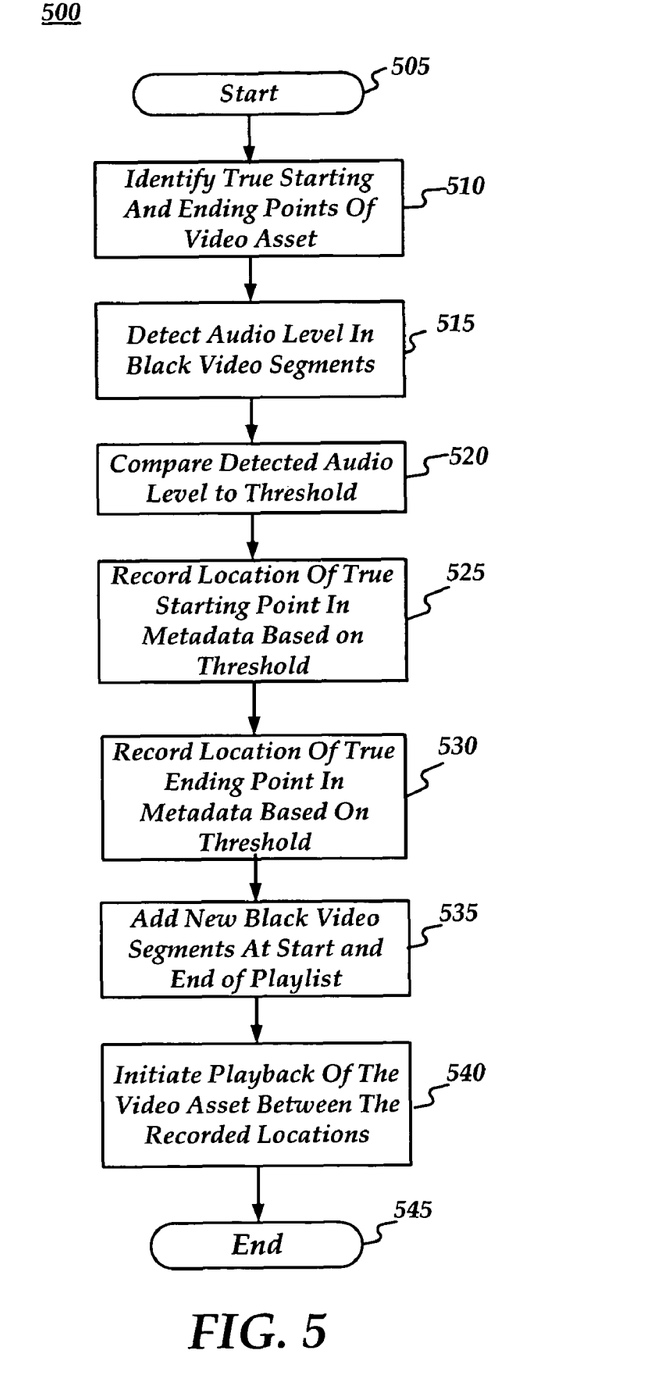
FIG. 5 is a flow chart illustrating a method for minimizing black video segments using audio detection, in accordance with an embodiment.

FIG. 5 is a flow chart setting forth the general stages involved in a method 500 consistent with an embodiment for method for minimizing black video segments using audio detection. Method 500 may be implemented using the components of CTS 100 as described above. Ways to implement the stages of method 500 will be described in greater detail below. Method 500 may begin at starting block 505 and proceed to stage 510 where the application program 140, executing on either the advertisement insertion device 120 or the user terminal 160, may identify the true starting and ending points of the VOD asset 130 in the playlist 125. In particular, the application 140 may utilize a black segment detection algorithm to identify the end of the leader asset black segment 220 (following one or more of the advertisements 135) as the asset true start point 205 and to identify the beginning of the trailer asset black segment 230 (preceding one or more of the advertisements 132) as the asset true end point 210.

From stage 510, method 500 may advance to stage 515 where the application program 140 may detect an audio level which may be present in the asset black segments 220 and 230. For example, the application program 140 may be configured to perform an audio level threshold test to detect the presence of audio (such as the audio streams 245 and 250) in the black segments 220 and 230.

From stage 515, method 500 may advance to stage 520 where the application program 140 may compare any audio detected at stage 515 to a threshold. For example, in accordance with an embodiment, the application program 140 may be configured to only skip the black segments 220 and 230 if there is either no audio during a black segment or if the detected audio is below a fixed threshold.

From stage 520, method 500 may advance to stage 525 where the application program 140 may record the location of the asset true start point 205 in the metadata 255 associated with the VOD asset 130 based on the detected audio threshold. For example, the application program 140 may record a normal play time of the start of the VOD asset content 222 (i.e., the true start of the asset without the black segments) in the metadata 255 only if the audio level exceeds a fixed threshold.

From stage 525, method 500 may advance to stage 530 where the application program 140 may record the location of the asset true end point 210 in the metadata 255 associated with the VOD asset 130. For example, the application program 140 may record a normal play time of the end of the VOD asset content 222 (i.e., the true end of the asset without the black segments) in the metadata 255.

From stage 530, method 500 may advance to stage 535 where the application program 140 may add the new black segments 235 and 240 to the beginning and end of the playlist 125. In particular, the new black segments 235 and 240 may be utilized during the playback of the playlist 125 to provide black segments which may be necessary for the CTS 100 and/or the user terminal 160 to lock on to the playlist 125 during playback and to tune to the channel that the playlist 125 is being targeted to.

From stage 535, method 500 may advance to stage 540 where the application program 140 initiate playback of the video asset between the recorded locations in the metadata 255. In particular, during playback of the playlist 125, the asset black segments 220 and 230 preceding and following the advertisements 135 may be skipped, thus effectively removing them from the VOD asset 130. From stage 540, method 500 may then end at stage 545. It should be understood by those skilled in the art that method 500 may be performed by a number of network devices in the CTS 100 which may include the advertisement insertion device 120 and the user terminal 160 (as discussed above) but which may also include other network devices such as routers.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for minimizing black video segments, comprising:
    using black detection on a playlist at a network device to identify a true starting point and a true ending point of a video asset comprising black video segments in the playlist;
    recording a location associated with the true starting point in metadata associated with the video asset;
    recording a location associated with the true ending point in metadata associated with the video asset;
    adding a new black video segment at a beginning of the playlist and a new black video segment at an end of the playlist; and
    initiating playback of the playlist at the network device, wherein the video asset is played back only between the recorded location associated with the true starting point and the recorded location associated with the true ending point to minimize the black video segments in the video asset.

2. The method of claim 1, further comprising:
    detecting an audio level in the black video segments;
    comparing the detected audio level to an audio level threshold; and
    recording the location associated with the true starting and ending points of the video asset in the metadata based on the audio level threshold.

3. The method of claim 2, wherein recording the location associated with the true starting and ending points in the metadata based on the audio level threshold comprises recording the location associated with the true starting point of the video asset in the metadata only when the threshold audio level threshold is exceeded.

4. The method of claim 2, wherein recording the location associated with the true starting and ending points in the metadata based on the audio level threshold comprises recording the location associated with the true ending point of the video asset in the metadata only when the threshold audio level threshold is exceeded.

5. The method of claim 1, wherein using black detection on the playlist to identify black video segments occurring prior to a true starting point and after a true ending point of the video asset comprises:
- utilizing black detection to identify a black video segment following at least one advertisement inserted prior to the video asset in the playlist; and
- utilizing black detection to identify a black video segment preceding at least one advertisement inserted after the video asset in the playlist.

6. The method of claim 1, wherein recording a location associated with the true starting point in the metadata associated with the video asset comprises recording a normal play time associated with the true starting point of the video asset.

7. The method of claim 1, wherein recording a location associated with the ending point in the metadata associated with the video asset comprises recording a normal play time associated with the true ending point of the video asset.

8. A method for minimizing black video segments, comprising:
- using black detection on a playlist at a network device to identify a true starting point and a true ending point of video on demand (VOD) content comprising black video segments in the playlist, wherein the playlist comprises the VOD content and advertising content;
- detecting an audio level in the black video segments;
- comparing the detected audio level to an audio level threshold;
- recording a location associated with the true starting point in metadata associated with the VOD content based on the audio level threshold;
- recording a location associated with the true ending point in metadata associated with the VOD content based on the audio level threshold;
- adding a new black video segment at a beginning of the playlist and a new black video segment at an end of the playlist; and
- initiating playback of the playlist at the network device, wherein the VOD content is played back only between the recorded location associated with the true starting point and the recorded location associated with the true ending point to minimize the black video segments in the VOD content.

9. The method of claim 8, wherein recording the location associated with the true starting point in the metadata based on the audio level threshold comprises recording the location associated with the true starting point of the VOD content in the metadata only when the threshold audio level threshold is exceeded.

10. The method of claim 8, wherein recording the location associated with the true ending point in the metadata based on the audio level threshold comprises recording the location associated with the true ending point of the VOD content in the metadata only when the threshold audio level threshold is exceeded.

11. The method of claim 8, wherein using black detection on the playlist to identify the black video segments occurring prior to a true starting point and after a true ending point of the VOD content comprises:
- utilizing black detection to identify a black video segment following at least one advertisement inserted prior to the VOD content in the playlist; and
- utilizing black detection to identify a black video segment preceding at least one advertisement inserted after the VOD content in the playlist.

12. The method of claim 8, wherein recording a location associated with the true starting point in the metadata associated with the VOD content comprises recording a normal play time associated with the true starting point of the VOD content.

13. The method of claim 8, wherein recording a location associated with the true ending point in the metadata associated with the VOD content comprises recording a normal play time associated with the true ending point of the VOD content.

14. An apparatus for minimizing black video segments in a video playlist, comprising:
- a memory storage for storing executable program code; and
- a processor, functionally coupled to the memory, the processor being responsive to instructions contained in the program code and operative to:
  - use black detection on the playlist to identify a true starting point and a true ending point of a video asset comprising black video segments in the playlist;
  - record a location associated with the true starting point in metadata associated with the video asset;
  - record a location associated with the true ending point in metadata associated with the video asset;
  - add new black video segments at a beginning of the playlist and a new black video segment at an end of the playlist; and
  - initiate playback of the playlist, wherein the video asset is played back only between the recorded location associated with the true starting point and the recorded location associated with the true ending point to minimize the black video segments in the video asset.

15. The apparatus of claim 14, wherein the processor is further operative to:
- detect an audio level in the black video segments;
- compare the detected audio level to an audio level threshold; and
- record the location associated with the true starting and ending points of the video asset in the metadata based on the audio level threshold.

16. The apparatus of claim 15, wherein the location associated with the true starting point of the video asset in the metadata is recorded only when the audio level threshold is exceeded.

17. The apparatus of claim 15, wherein the location associated with the true ending point of the video asset in the metadata is recorded only when the audio level threshold is exceeded.

18. The apparatus of claim 14, wherein the black detection is utilized to:
- identify a black video segment following at least one advertisement inserted prior to the video asset in the playlist; and
- identify a black video segment following at least one advertisement inserted after the video asset in the playlist.

19. The apparatus of claim 14, wherein the location associated with the true starting point in the metadata associated with the video asset is recorded as a normal play time associated with the true starting point of the video asset.

20. The apparatus of claim 14, wherein the location associated with the true ending point in the metadata associated with the video asset is recorded as a normal play time associated with the true ending point of the video asset.

* * * * *